(12) United States Patent
Fagot-Revurat et al.

(10) Patent No.: US 11,051,087 B2
(45) Date of Patent: Jun. 29, 2021

(54) ELECTRONIC ASSEMBLY WITH A PATCH FOR A TIRE

(71) Applicant: COMPAGNIE GENERALE DES ETABLISSEMENTS MICHELIN, Clermont-Ferrand (FR)

(72) Inventors: Lionel Fagot-Revurat, Clermont-Ferrand (FR); Thomas Mosnier, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 0 days.

(21) Appl. No.: 16/762,627

(22) PCT Filed: Nov. 5, 2018

(86) PCT No.: PCT/IB2018/058651
§ 371 (c)(1),
(2) Date: May 8, 2020

(87) PCT Pub. No.: WO2019/092573
PCT Pub. Date: May 16, 2019

(65) Prior Publication Data
US 2020/0280770 A1 Sep. 3, 2020

(30) Foreign Application Priority Data
Nov. 8, 2017 (FR) ........................................ 1771176

(51) Int. Cl.
*H04Q 9/00* (2006.01)
*B60C 23/04* (2006.01)
*B60C 23/20* (2006.01)

(52) U.S. Cl.
CPC ............ *H04Q 9/00* (2013.01); *B60C 23/0493* (2013.01); *B60C 23/20* (2013.01); *H04Q 2209/40* (2013.01)

(58) Field of Classification Search
CPC .. H04Q 9/00; H04Q 2209/00; H04Q 2209/40; H04Q 2209/80; B60C 23/00; B60C 23/0493; B60C 23/20
See application file for complete search history.

(56) References Cited

U.S. PATENT DOCUMENTS

| 5,500,065 A | 3/1996 | Koch et al. |
| 5,562,787 A | 10/1996 | Koch et al. |

(Continued)

FOREIGN PATENT DOCUMENTS

| EP | 0689950 A2 | 1/1996 |
| EP | 2777958 A1 | 9/2014 |

(Continued)

OTHER PUBLICATIONS

International Search Report dated Dec. 6, 2018, in corresponding PCT/IB2018/058651 (4 pages).

(Continued)

*Primary Examiner* — Franklin D Balseca
(74) *Attorney, Agent, or Firm* — Venable LLP

(57) ABSTRACT

An electronic assembly (1) for a tire comprises an electronic module (30) and a rubber patch (10) provided with a housing (14) suitable for allowing the positioning of an active part of the electronic module (30) in said housing (14), wherein the patch (10) is configured according to a substantially elongate axial profile with a base (12) and a top (19) separated by a lateral wall (11), said patch (10) comprising a lateral opening (13) communicating with the housing (14); the electronic module (30) is configured according to a substantially elongate axial profile and comprises a gripping head (31)

(Continued)

extending axially so as to project out of the patch (10); and the gripping head (31) of the electronic module (30) is covered with a protective rubber jacket (20).

13 Claims, 1 Drawing Sheet

(56) References Cited

U.S. PATENT DOCUMENTS

| | | | |
|---|---|---|---|
| 5,573,610 | A | 11/1996 | Koch et al. |
| 5,573,611 | A | 11/1996 | Koch et al. |
| 7,652,561 | B2 | 1/2010 | Pimort |
| 9,834,044 | B2 | 12/2017 | Luce |
| 9,950,575 | B2 * | 4/2018 | Marques ............ B60C 23/0442 |
| 10,406,868 | B2 * | 9/2019 | So ..................... B29D 30/0061 |
| 2007/0241871 | A1 | 10/2007 | Pimort |
| 2014/0261944 | A1 * | 9/2014 | Papakonstantopoulos .................. B60C 5/14 152/510 |
| 2016/0229237 | A1 | 8/2016 | Luce |

FOREIGN PATENT DOCUMENTS

| | | |
|---|---|---|
| FR | 2870031 A1 | 11/2005 |
| FR | 3028451 A1 | 11/2014 |

OTHER PUBLICATIONS

Dennis: "USB Stick Corsair Flash Voyager GT im test", May 24, 2014 (May 24, 2014), XP 002782384, Retrieved from the Internet on Jun. 5, 2018: URL:http://www.usb-stick-tests.de/test-29-corsair_flash_voyager_gt_im_test, with attached explanatoin of relevance (2 pages).

* cited by examiner

ELECTRONIC ASSEMBLY WITH A PATCH FOR A TIRE

TECHNICAL FIELD OF THE INVENTION

The present invention relates to an electronic assembly for a tyre comprising a patch provided with a housing suitable for housing an electronic module.

STATE OF THE ART

Generally, two solutions are known that make it possible to fix electronic tyre modules.

The first solution consists in incorporating an electronic module into the tyre and making it permanently fixed. For that, the electronic module is mechanically and irreversibly secured to the tyre. Such an arrangement makes it possible to make the fixing of the module reliable, presenting no risk of separation from the tyre. This solution does however prevent the replacement or the modification of the electronic module. It is not therefore compatible with electronic systems that are designed to be removable.

For example, the document FR2870031 describes a method for monitoring a tyre with which a land vehicle is equipped. This method is implemented by means of a central control unit, and electronic chips implanted in the sidewalls of the tyre. The chips of one and the same tyre have identical identification codes and respective codes representative of their locations on this tyre.

The second solution provides for the incorporation of an electronic module using a patch, often of rubber material, in which the module is housed removably.

For example, the document FR3028451 describes a device for fixing, to the inner wall of a tyre, an electronic unit for measuring parameters inside the tyre, the device associating said unit with a flexible receptacle which is fixed to said inner wall by an adhesion means, is preformed to accommodate and retain said unit, noteworthy in that said flexible receptacle forms a compartment equipped with an opening, through which said unit is introduced and which is bordered by a flange extending outwards and offering a contact surface for the adhesion means so that, once the receptacle is fixed, said opening is closed by the inner wall onto which the receptacle is fixed. Consequently, once the receptacle is fixed to the wall of the tyre, the electronic module is removable only if the receptacle is unstuck. The receptacle must therefore be changed every time the electronic module is removed.

The document EP2777958 describes an elastomer coating comprising a piece made of rubber containing a cavity to removably hold a module intended to be used to assist in the operation of a tyre. The cavity is configured with an opening to facilitate the insertion and the removal of the module from the cavity. The elastomer coating comprises a non-hardened or partially hardened rubber composition. In most of the embodiments presented, the slit allowing the insertion of the electronic module is situated on the top of the rubber part. In this configuration, the sealing of the cavity is not tight. The disposition of the slit presents risks of ejection of the module. A configuration with a lateral opening is presented. However, this opening is not reclosable and the module remained exposed to any contaminants, fluids and dust likely to be located in the cavity of the tyre.

The solutions revealed by the state of the art present some imperfections regardless of their arrangements. There is consequently a need for an effective solution that makes it possible to fix an electronic module to an inner wall of a tyre removably, while minimizing the risk of damage caused to the tyre if a module were to be detached from its fixing point.

To overcome these various drawbacks, the invention provides various technical means.

SUMMARY OF THE INVENTION

A first objective of the invention consists in providing a fixing means for fixing an electronic module against an inner wall of a tyre.

Another objective of the invention consists in providing a protection means for an electronic module designed for fixing against an inner wall of a tyre.

Yet another objective of the invention consists in providing a fixing means for an electronic module that makes it possible to perform a simple installation and removal of the electronic module in the fixing means.

Another objective of the invention consists in providing a sealed fixing means protecting the electronic module against possible contaminants likely to affect its correct operation.

Finally, another objective of the invention consists in providing a fixing system that protects the inner wall of the tyre in case of separation.

For this, the invention provides an electronic assembly for a tyre comprising an electronic module and a rubber patch provided with a housing suitable for allowing the positioning of an active part of the electronic module in said housing, wherein:

the patch is configured according to a substantially elongate axial profile with a base and a top separated by a lateral wall, said patch comprising a lateral opening communicating with the housing, for insertion and removal of the active part of the electronic module into said housing, said opening being arranged on the lateral wall;

the electronic module is configured according to a substantially elongate axial profile and comprises a gripping head extending axially so as to project out of the patch when the electronic module active part is positioned in the housing;

the gripping head of the electronic module is covered with a protective rubber jacket whose profile is designed to substantially seal the patch when the active part of the electronic module (30) is positioned in its housing.

The patch provides an effective protection against dust, fluids and any contaminant likely to be located in the internal cavity of the tyre. Such an assembly makes it possible to provide an effective protection covering all of the surface of the electronic module. In case of accidental detachment of the patch, the risk of damage to the tyre is thus considerably reduced. The patch also makes it possible to produce a mechanical decoupling between the electronic module and the wall of the tyre onto which the patch is fixed.

Advantageously, the patch comprises a lateral orifice designed to be in fluidic communication with the cavity of the tyre when the patch is fixed against the inner wall of the tyre.

This feature allows an intake of air from the cavity in the tyre and thus makes it possible to measure the operating parameters of the tyre, such as, for example, the pressure and the temperature. The orifice is preferably gauged or provided with a filter to avoid the intake of dust or contaminants into the housing of the patch.

Also advantageously, the patch and the electronic module housing have, on the side opposite the lateral opening, a substantially conical axial profile. This form with a narrowing profile facilitates the insertion of the module into the housing. The profile is advantageously similar to that of the antenna.

According to an advantageous embodiment, the patch and the electronic module housing have, on the side of said lateral opening, a substantially rounded axial profile.

According to another advantageous embodiment, the electronic module housing comprises two zones, i.e. an antenna zone, on the side of the substantially conical axial profile, and an electronic components zone, on the side of the substantially rounded axial profile.

According to yet another advantageous embodiment, the electronic components zone has a thickness greater than the antenna zone.

These features allow the correct positioning of the electronic module in the patch and a very good hold.

Advantageously, the housing is situated at a distance "d" from the base. This architecture provides a mechanical decoupling between the electronic module and the tyre. The electronic module is thus protected from the deformations of the tyre, which would be likely to damage it.

Also advantageously, an air chamber is arranged under the housing.

According to an advantageous embodiment, the assembly comprises a porous foam insert, for insertion into said air chamber.

This feature makes it possible to protect the electronic module against possible dust or contaminants likely to penetrate into the housing.

According to another advantageous embodiment, the surface area of the opening is substantially smaller, for example by approximately 10%, than the maximum transverse surface area of the electronic module.

This architecture allows the electronic module to remain in place in the housing after insertion therein. The opening of low surface area forms a restriction acting as a holding and/or blocking device. Since the opening is narrower than the widest part of the electronic module, the latter does not risk leaving the patch accidentally.

Advantageously, the electronic module is designed to supply tyre identification data and data relating to the physical operating parameters of the tyre onto which the assembly is fixed.

This feature makes it possible to ensure the traceability of the tyre and obtain data relating to the operation such as pressure, temperature, etc.

The invention also provides a rubber patch for the electronic assembly as previously described.

The invention also provides a protective jacket for an electronic assembly as previously described.

DESCRIPTION OF THE FIGURES

All the embodiment details are given in the following description, complemented by the FIGS. 1a to 5, presented only as nonlimiting examples, and in which:

FIG. 1b is a top view of the electronic assembly of FIG. 1a;

FIG. 4b is a bottom view of the patch of FIG. 4a;

FIG. 4d is a cross-section in elevation of the patch of FIG. 4a;

DETAILED DESCRIPTION OF THE INVENTION

Figure 1A:
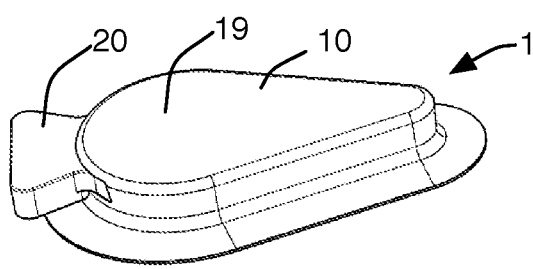
FIG. 1a is a perspective view of an example of an electronic assembly.

As illustrated in FIGS. 1a, 1b, 2, 3a and 3b, the electronic assembly 1 for a tyre is composed of an electronic module 30 comprising a gripping head 31, a rubber patch 10 provided with a housing 14 for insertion of the electronic module 30, and a protective rubber jacket 20 specifically provided to cover the gripping head 31 of the electronic module 30.

The electronic module 30 is designed to supply tyre identification data and data relating to the physical operating parameters of the tyre onto which the assembly 1 is fixed.

Figure 2:
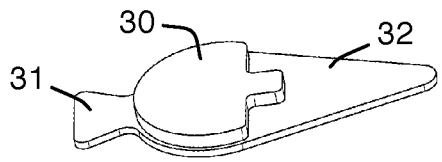
FIG. 2 is a perspective view of an example of an electronic module.
Figure 3A:
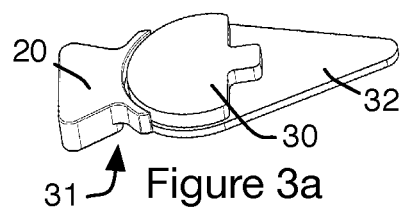
FIG. 3a is a perspective view of the electronic module of FIG. 2 with a protective jacket.
Figure 3B:
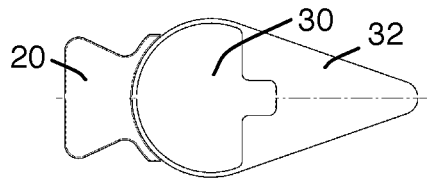
FIG. 3b is a top view of the electronic module of FIG. 3a with the protective jacket.

As illustrated in FIGS. 2, 3a and 3b, the electronic module 30 is substantially elongate, configured according to an axial profile and oriented along the axis A-A. It comprises, also oriented along the axis A-A, a gripping head 31 designed so as to project out of the patch 10 when the active part of the electronic module 30 is positioned in the housing 14 of the patch. The gripping head allows a user to manipulate the electronic module to insert it into and/or extract it from the patch. In the examples illustrated, for example in FIGS. 4b and 4d, the electronic module is provided with an antenna zone 16 and an electronic components zone (for components other than the antenna). As illustrated, the electronic components zone 15 has a thickness greater than the antenna zone 16, the latter being easy to produce with a minimalist thickness.

In the examples illustrated, the thin antenna zone is preferably provided with a substantially conical axial profile. The components zone 15 is arranged with a substantially circumferential axial profile.

Figure 1B:
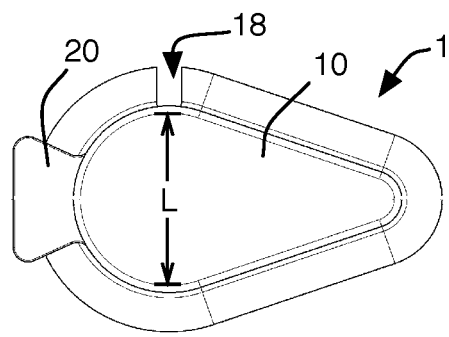

The patch is illustrated in FIGS. 1a and 1b. It comprises a housing 14 suitable for allowing the active part of the electronic module 30 to be housed.

Like the electronic module that it houses and protects, the patch 10 is configured according to a substantially elongate axial profile with a base 12 and a top 19 separated by a lateral wall 11.

Figure 4A:
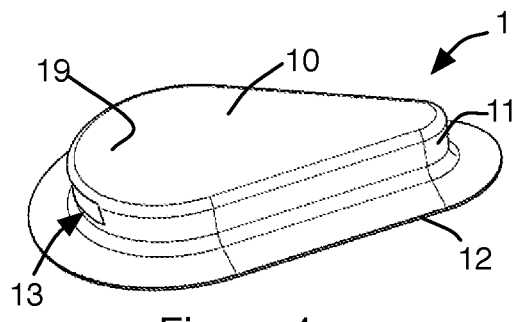
FIG. 4a is a perspective view of an example of a patch.
Figure 4B:
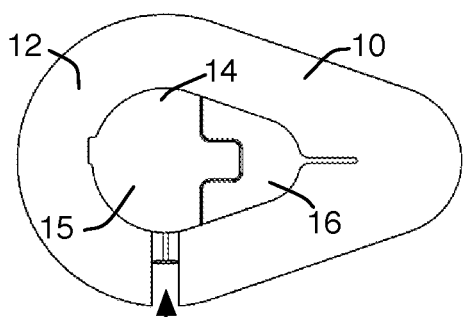
Figure 4C:
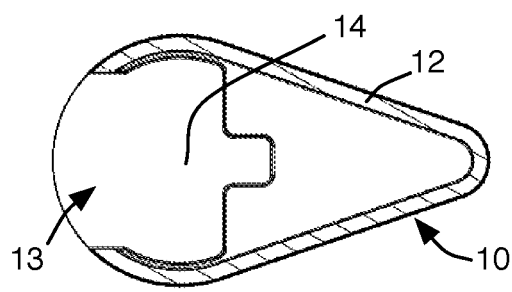
FIG. 4c is a longitudinal cross section of the patch of FIG. 4a in order to show the internal housing.

As illustrated in particular in FIGS. 4a and 4c, the patch 10 comprises a lateral opening 13 communicating with the housing 14. This lateral opening 13 allows the insertion and/or the removal of the active part of the electronic module 30 in the housing 14. This opening 13 is arranged on the lateral wall 11, on the side of the circumferential profile. The surface area of the opening 13 is substantially smaller than the maximum transverse surface area of the electronic module 30 so as to produce a closure with a light grip, sufficient to render the placement and the closure tight. The surface area difference is advantageously of the order of 10%.

Figure 4D:
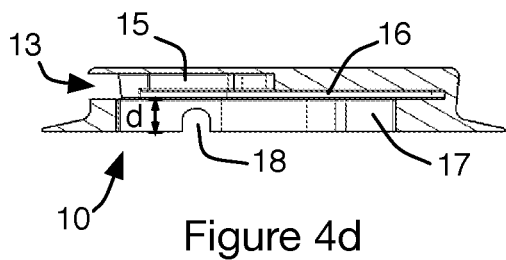

A lateral orifice 18, visible in FIGS. 4b and 4d, allows fluidic communication with the cavity of the tyre when the patch 10 is put in place against the inner wall of the tyre.

Like the electronic module 30, the patch 10 and the electronic module housing 14 have, on the side opposite the lateral opening 13, a substantially conical axial profile. Moreover, on the side of said lateral opening 13, the patch has a substantially circumferential axial profile.

Also so as to correspond to the architecture of the electronic module 30, the electronic module housing 14 comprises two zones, i.e. an antenna zone 16, on the side of the substantially conical axial profile, and an electronic components zone 15, on the side of the substantially circumferential axial profile.

The electronics components zone 15 has a thickness greater than the antenna zone 16.

As FIG. 4d shows, the housing 14 is situated at a distance "d" from the base 12. An air chamber 17 is arranged under the housing 14. This chamber is used for example to house a porous foam insert, to protect the electronic components.

To make the electronic assembly uniform, and protect the electronic module well, the gripping head 31 of the electronic module 30 is covered with a protective rubber jacket 20, as shown for example in FIGS. 3a and 3b. This jacket is provided to provide a substantially tight closure of the patch 10 when the active part of the electronic module 30 is housed in its housing 14.

Recapping System and Method

Figure 5:
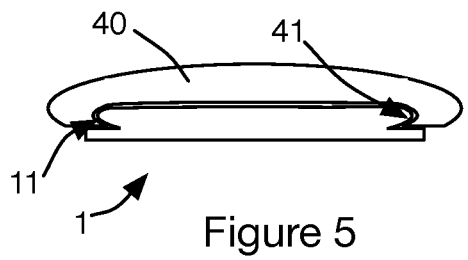
FIG. 5 is an elevation view from behind of an example of a patch on which a protective cover is placed.

FIG. 5 illustrates another aspect of the invention, relating to a method and a system for recapping tyres comprising an electronic assembly as previously described fixed to an inner wall of a tyre.

In the system provided, as illustrated in FIG. 5, the patch comprises outer lateral walls 11 that are inclined to form a dovetailed outer profile. The system also comprises a protective cover 40 for the rubber patch 10 suitable for covering said patch. Like the outer walls of the patch 10, the protective cover 40 comprises inner lateral walls 41 that are inclined to form a dovetailed inner profile suitable for holding for the cover 40 against the patch 10. The cover can easily be put in place for example by snap-fitting it against the patch. To facilitate its removal, the cover 40 is elastically deformable so as to be able to unsnap it from the patch. The cover put in place against the patch protects the latter during the vulcanization operation provided at the end of a tyre recapping process cycle. The vulcanization of the new tread is thus performed without the risk of damaging the patch, which could otherwise crack or form incipient break zones without such protection. To this end, the cover 40 is advantageously made of silastene.

By virtue of the recapping system previously described, and more particularly by virtue of the cover 40, an advantageous recapping method can be implemented. This implementation further provides for removal of the electronic module 30 from the patch 10 used as a fixing in order to avoid this element, which is particularly brittle and sensitive to heat and pressure, being damaged because of the extreme conditions due to the vulcanization phase. A new tread is applied to the tyre. A possible step of preparation of the surface receiving the tread is advantageously performed, in order to optimize the laying, and promote a lasting hold of, the new tread. A protective cover 40 resistant to vulcanization is laid against the patch so as to cover the latter. This step takes place before the vulcanization, and possibly, before the laying of the new tread. The step of vulcanization of the tyre with the new tread is then implemented, the cover 40 serving as protection for the patch. When stripped from the mould, the protective cover 40 of the patch can be removed, and the electronic module 30 can be reinserted into the rubber patch 10.

This recapping method makes it possible to fit and vulcanize a new tread on a tyre carcass comprising an electronic assembly as previously described.

REFERENCE NUMBERS EMPLOYED IN THE FIGURES

1 Electronic assembly
10 Rubber patch
11 Outer lateral wall of the patch (inclined)
12 Base
13 Opening
14 Housing
15 Components zone
16 Antenna zone
17 Air chamber
18 Communicating orifice
19 Top of the patch
20 Protective rubber jacket
30 Electronic module
31 Gripping head
32 Antenna
40 Protective cover
41 Inner lateral wall (inclined and corresponding substantially to the outer wall of the patch)

The invention claimed is:

1. An electronic assembly for a tire comprising an electronic module and a rubber patch provided with a housing configured to allow positioning of an active part of the electronic module in the housing,
wherein the rubber patch is configured according to a substantially elongate axial profile with a base and a top separated by a lateral wall, the rubber patch comprising a lateral opening communicating with the housing, for insertion and removal of the active part of the electronic module into the housing, and the lateral opening being arranged on the lateral wall,
wherein the electronic module is configured according to a substantially elongate axial profile and comprises a gripping head extending axially so as to project out of the rubber patch when the active part of the electronic module is positioned in the housing, and
wherein the gripping head of the electronic module is covered with a protective rubber jacket the profile of which is designed to substantially seal the rubber patch when the active part of the electronic module is positioned in the housing.

2. The electronic assembly according to claim 1, wherein the rubber patch comprises a lateral orifice configured to be in fluidic communication with a cavity in the tire when the rubber patch is fixed against an inner wall of the tire.

3. The electronic assembly according to claim 1, wherein the rubber patch and a housing of the electronic module have, on a side opposite to the lateral opening, a substantially conical axial profile.

4. The electronic assembly according to claim 1, wherein the rubber patch and a housing of the electronic module have, on a side of the lateral opening, a substantially circumferential axial profile.

5. The electronic assembly according to claim 1, wherein the rubber patch and a housing of the electronic module have, on a side opposite to the lateral opening, a substantially conical axial profile,
wherein the rubber patch and the housing of the electronic module have, on a side of the lateral opening, a substantially circumferential axial profile, and
wherein the housing of the electronic module comprises two zones, one being an antenna zone, on the side of the substantially conical axial profile, and one being an electronic components zone, on the side of the substantially circumferential axial profile.

6. The electronic assembly according to claim 5, wherein the electronic components zone has a thickness greater than the antenna zone.

7. The electronic assembly according to claim 1, wherein the housing is situated at a distance d from the base.

8. The electronic assembly according to claim 7, wherein an air chamber is arranged under the housing.

9. The electronic assembly according to claim 8 further comprising a porous foam insert, for insertion into the air chamber.

10. The electronic assembly according to claim 1, wherein a surface area of the lateral opening is substantially smaller than a maximum transverse surface area of the electronic module.

11. The electronic assembly according to claim 1, wherein the electronic module is configured to supply tire identification data and data relating to physical operating parameters of the tire onto which the electronic assembly is fixed.

12. A rubber patch for an electronic assembly according to claim 1.

13. A protective jacket for an electronic assembly according to claim 1.

* * * * *